United States Patent
Matsuo et al.

(10) Patent No.: US 7,669,340 B2
(45) Date of Patent: Mar. 2, 2010

(54) SURVEYING APPARATUS

(75) Inventors: Shunji Matsuo, Tokyo (JP); Homu Takayama, Saitama (JP); Takanori Yachi, Tokyo (JP); Masatoshi Sakurai, Saitama (JP)

(73) Assignee: Pentax Industrial Instruments Co., Ltd., Tokyo (JP)

( * ) Notice: Subject to any disclaimer, the term of this patent is extended or adjusted under 35 U.S.C. 154(b) by 84 days.

(21) Appl. No.: 11/772,431

(22) Filed: Jul. 2, 2007

(65) Prior Publication Data

US 2008/0120856 A1    May 29, 2008

(30) Foreign Application Priority Data

Jul. 3, 2006    (JP)    ............... 2006-183410

(51) Int. Cl.
G01C 15/00    (2006.01)
G01C 1/04    (2006.01)
(52) U.S. Cl. .......................................... 33/290; 33/292
(58) Field of Classification Search .................. 33/290, 33/291, 292
See application file for complete search history.

(56) References Cited

U.S. PATENT DOCUMENTS

| | | | | |
|---|---|---|---|---|
| 4,458,868 | A | * | 7/1984 | Hess ........................ 248/183.2 |
| 5,285,397 | A | * | 2/1994 | Heier et al. .................. 702/167 |
| 6,034,722 | A | * | 3/2000 | Viney et al. .................. 348/135 |
| 6,108,071 | A | * | 8/2000 | Landry et al. ............... 356/5.05 |
| 7,319,511 | B2 | * | 1/2008 | Murai et al. ................ 356/4.03 |
| 2004/0004706 | A1 | * | 1/2004 | Uezono et al. .................. 356/3 |
| 2005/0195384 | A1 | * | 9/2005 | Ohtomo et al. ............. 356/4.05 |
| 2005/0207621 | A1 | * | 9/2005 | Murai et al. ................. 382/106 |
| 2005/0275829 | A1 | * | 12/2005 | Kumagai et al. ............. 356/139 |
| 2008/0018880 | A1 | * | 1/2008 | Matsuo et al. ............. 356/4.01 |
| 2008/0069406 | A1 | * | 3/2008 | Matsuo et al. .............. 382/106 |
| 2008/0120855 | A1 | * | 5/2008 | Matsuo et al. ................ 33/290 |
| 2008/0120856 | A1 | * | 5/2008 | Matsuo et al. ................ 33/299 |
| 2008/0123903 | A1 | * | 5/2008 | Matsuo et al. .............. 382/106 |

FOREIGN PATENT DOCUMENTS

| | | | |
|---|---|---|---|
| JP | 6-137857 | | 5/1994 |
| JP | 07063557 | A * | 3/1995 |
| JP | 09304053 | A * | 11/1997 |
| JP | 11-337336 | | 12/1999 |
| JP | 3281064 | | 2/2002 |
| JP | 2009139319 | A * | 6/2009 |

OTHER PUBLICATIONS

English language Abstract of JP 6-137857.
English language Abstract of JP 11-337336.

(Continued)

*Primary Examiner*—R. A. Smith
(74) *Attorney, Agent, or Firm*—Greenblum & Bernstein P.L.C.

(57) ABSTRACT

A surveying apparatus is provided that includes a telescope block, a support block, and an imaging unit. The telescope block includes a sighting telescope and is rotatably supported about a first axis. The support block rotatably supports the telescope block about the first axis. The imaging unit is provided inside the telescope block. The imaging unit comprises an image-display device and at least one of an image data output device and an image data recording device.

20 Claims, 3 Drawing Sheets

OTHER PUBLICATIONS

U.S. Appl. No. 11/772,369 to Matsuo et al., filed Jul. 2, 2007.
U.S. Appl. No. 11/772,476 to Matsuo et al., filed Jul. 2, 2007.
U.S. Appl. No. 11/857,601 to Matsuo et al., filed Sep. 19, 2007.
U.S. Appl. No. 11/772,331 to Matsuo et al., filed Jul. 2, 2007.

* cited by examiner

SURVEYING APPARATUS

BACKGROUND OF THE INVENTION

1. Field of the Invention

The present invention relates to a surveying apparatus provided with a camera for capturing an image in a surveying field.

2. Description of the Related Art

A surveying apparatus provided with a camera, such as a total station, a theodolite, etc., includes a telescope block for sighting. In general, the telescope block is rotatably supported by a support block (the body of the surveying apparatus) about a horizontal axis and the support block is rotatably supported by a leveling board about a vertical axis. In this type of surveying apparatus, electronic circuits of a phase modulation measurement module or a pulse laser module, and the imaging device of a camera, are installed inside the telescope block while a control circuit to control the entire system of the apparatus, an image signal processor, and an image-display device, are installed inside the support block.

Because of this, distance measurement data, angle measurement data, and image data are transmitted from the telescope block to the support block through a rotational electrical contact ring that is disposed between the telescope block and the support block. However, the available space for the rotational electrical contact ring to be disposed is limited so that as the number of contact points increases, the available size of each terminal for the contact points is reduced. Thereby, when a number of contact points are required, it is difficult to secure stable electrical communication via a rotational electrical contact ring over a wide range of temperatures from a low temperature to a high temperature. Conversely, when the number of contact points is decreased, the image signals are required to be transmitted as analog signals, so the resolution and/or the quality of the image deteriorate. Japanese Patent Publication No. 3281064, as a countermeasure, discloses a surveying apparatus that guides incident light from the sighting telescope from the telescope block to the support block through a shaft between the blocks, and an optical image projected on an imaging device provided inside the support block is captured.

SUMMARY OF THE INVENTION

However, the above-discussed structure requires an optical system that is provided inside the shaft, thus implying structural complications and increase in production costs.

Therefore, an object of the present invention is to provide a surveying apparatus including a telescope block with a built-in digital camera that is able to output and/or record image data obtained by the digital camera without the quality and the resolution of the image deteriorating.

According to the present invention, a surveying apparatus including a telescope block, a support block, and an imaging unit, is provided.

The telescope block includes a sighting telescope and is rotatably supported about a first axis. The support block rotatably supports the telescope block about the first axis. The imaging unit is provided inside the telescope block. The imaging unit comprises an image-display device and at least one of an image data output device and an image data recording device.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
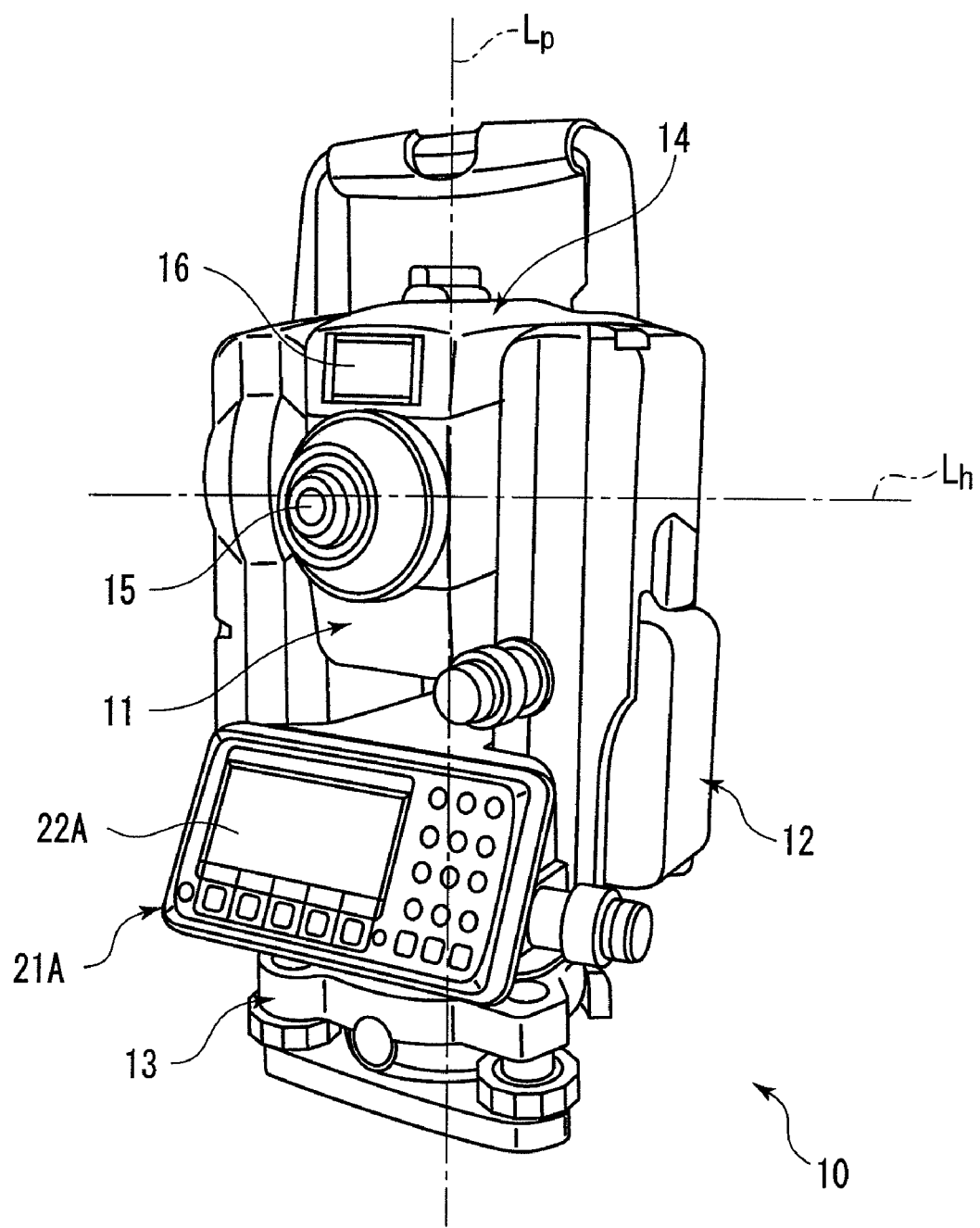
FIG. 1 is a perspective view showing the rear appearance of a surveying apparatus provided with a camera, to which an embodiment of the present invention is applied.

The present invention is described below with reference to the embodiments shown in the drawings.

Figure 2:
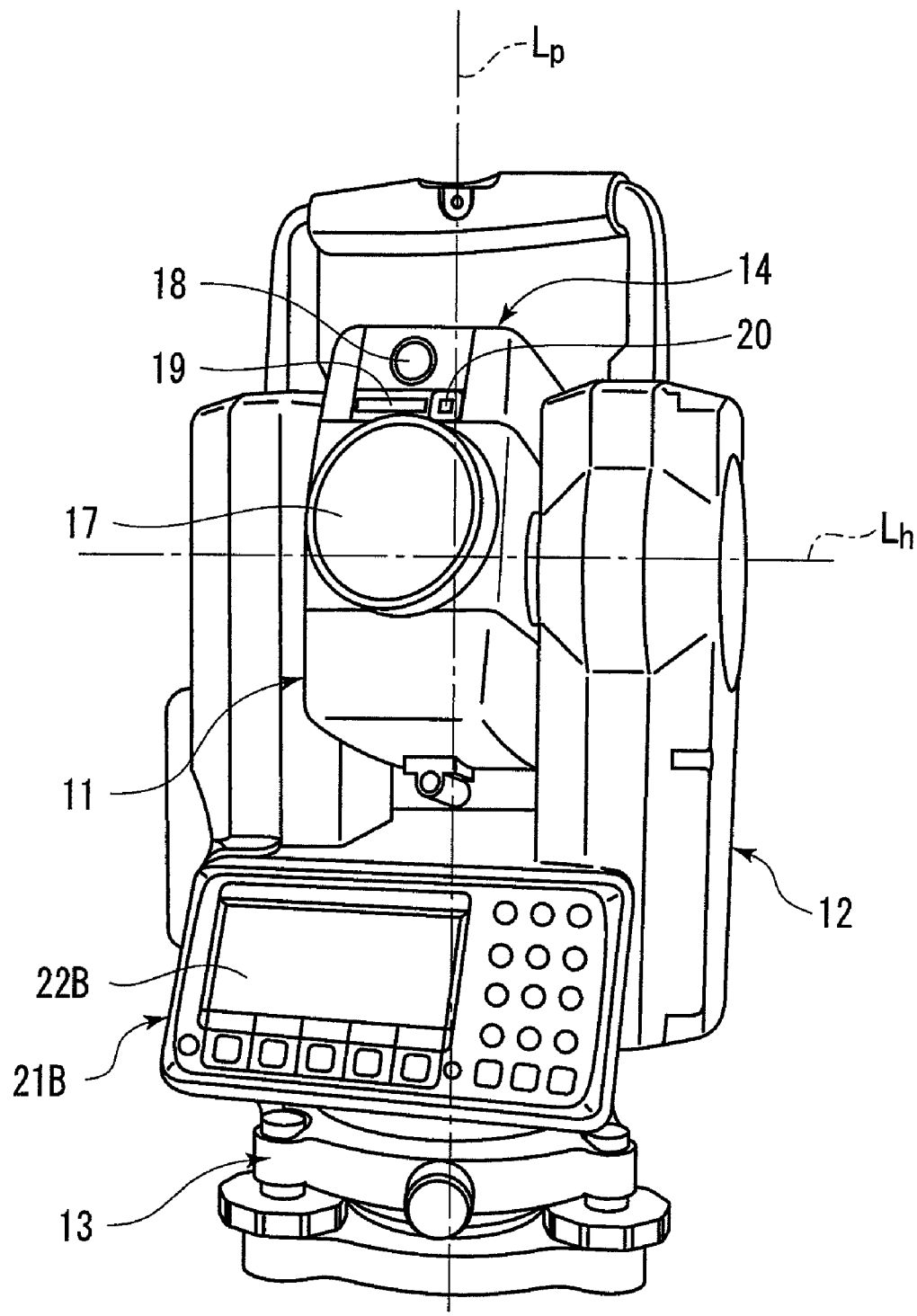
FIG. 2 is a perspective view showing the front appearance of the surveying apparatus illustrated in FIG. 1.

FIG. 1 is a perspective view showing the rear appearance of a surveying apparatus provided with a camera, to which an embodiment of the present invention is applied. FIG. 2 is a perspective view showing the front appearance of the surveying apparatus illustrated in FIG. 1.

The surveying apparatus 10 can be any type that is rotatable about at least one axis (e.g., a horizontal or vertical axis), such as a total station, a theodolite, etc. However, in the following descriptions, a total station will be chosen as an exemplary of the surveying apparatus 10.

The surveying apparatus 10 includes a telescope block 11, a support block 12, which corresponds to the main body of the surveying apparatus 10, and a leveling board 13. The telescope block 11 is rotatably supported about a horizontal axis Lh by the support block 12 from both sides. Further, the support block 12 is placed on the leveling board 13 and rotatably supported about a vertical axis Lp.

A sighting telescope and a digital camera unit 14 are provided inside the telescope block 11. On the rear of the telescope block 11, an ocular lens 15 of the sighting telescope and an image-display device 16 (e.g., an LCD) of the digital camera unit 14 are arranged. In the present embodiment, the ocular lens 15 and the image-display device 16 are aligned below and above each other, respectively. The image-display device 16 is preferably positioned above the ocular lens 15 for an erecting observation.

On the front of the telescope block 11, an objective lens 17 of the sighting telescope is arranged. Further, a photographing lens 18 of the digital camera unit 14, a socket 19 to which a card type recording medium is attached, and an I/O connector 20 for connecting the external device, are arranged on the front of the telescope block 11.

Operational panels 21A and 21B are provided on the support block 12. The operational panels 21A and 21B are arranged with indicating devices 22A and 22B, such as an LCD, and operational switches.

Figure 3:
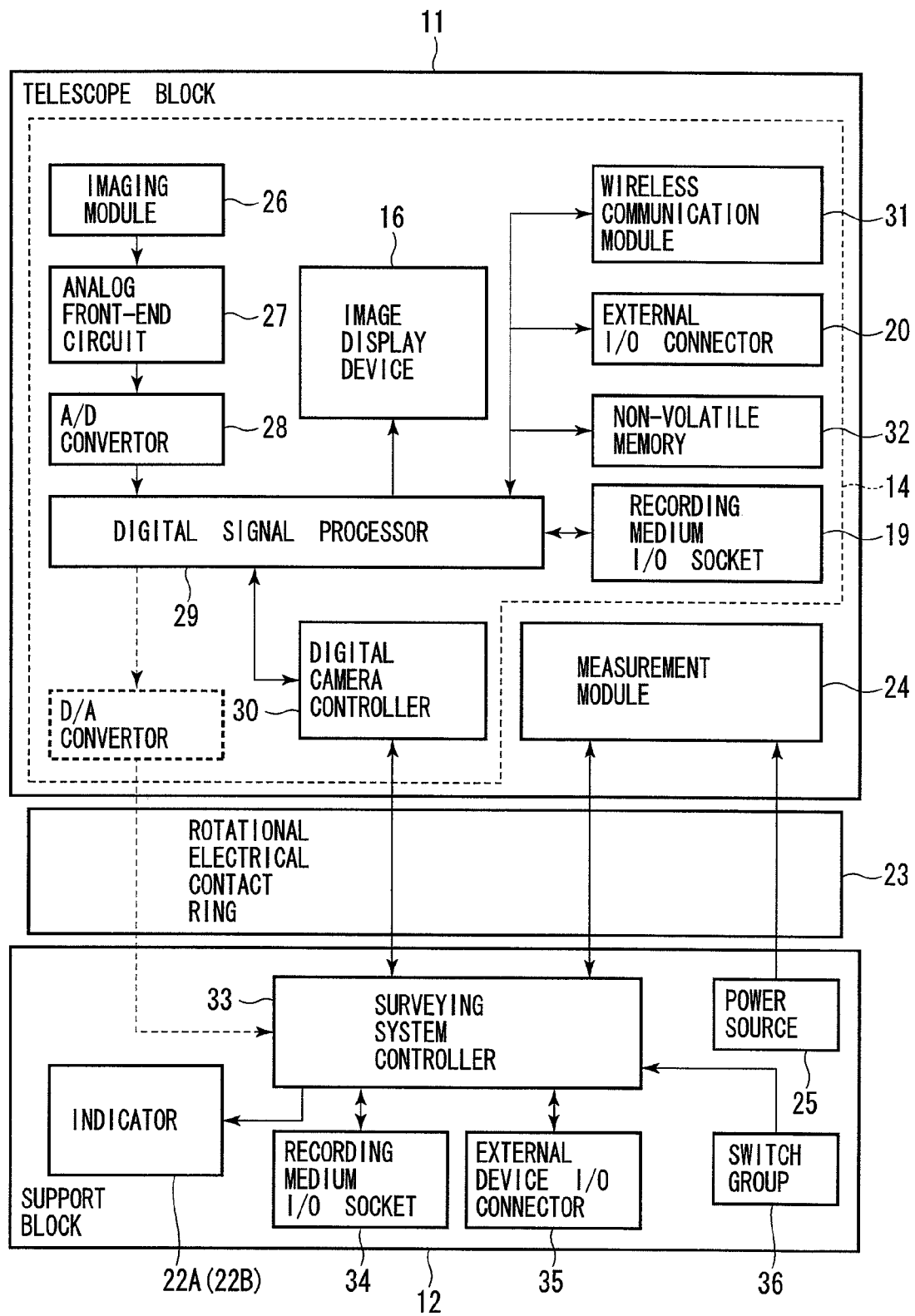
FIG. 3 is a block diagram that schematically illustrates the electrical structures of a telescope block and a support block of the surveying apparatus.

With reference to FIG. 3, the electrical structure of the surveying apparatus 10 is explained. The electrical structure of the telescope block 11 and the support block 12 of the surveying apparatus 10 are schematically illustrated in FIG. 3.

The telescope block 11 and the support block 12 are electrically connected to each other via a well-known conventional rotational electrical contact ring 23. The rotational electrical contact ring 23 is a contact ring provided in the shaft that supports the telescope block 11 rotatably about the horizontal axis Lh.

The digital camera unit 14 and a measurement module 24 are installed inside the telescope block 11. The measurement module 24 includes a distance measurement device, such as a phase modulation measurement module or a pulse radar module. Electric power is supplied from a power source 25 inside the support block 12 to the digital camera unit 14 and the measurement module 24 through the rotational electrical contact ring 23.

The digital camera unit 14 is provided with an imaging module 26 that includes a photographing lens system and a solid-state imaging device. Namely, images of the object to be surveyed, including measurement points, are captured while carrying out the surveying. The image signals, which are obtained by the solid-state imaging device, are subjected to predetermined analog signal processing in an analog front-end circuit 27 and converted to digital image signals by an A/D converter 28, and then fed to a digital signal processor 29.

The image signals processed by the digital signal processor 29 are fed to the image-display device 16, which could be, for example, an LCD. Namely, the captured image is displayed on the image-display device 16. Note that the digital signal processor 29 is connected to a digital camera controller (CPU) 30, thereby the digital signal processor 29 is controlled by instructions therefrom.

Further, the I/O socket 19 for connecting a card-type recording medium; the I/O connector 20 for connecting an external device, such as a computer; a wireless communication module 31 used to communicate with the external devices; and a non-volatile memory 32 for storing image data and other data within the digital camera unit 14; are connected to the digital signal processor 29.

On the other hand, a surveying system controller (CPU) 33, which is used to control the entire system of the surveying apparatus 10, is provided inside the support block 12. The surveying system controller 33 is electrically connected to the digital camera controller 30 and the measurement module 24 via the rotational electrical contact ring 23. Therefore, the distance measurement, the angle measurement, a laser-emitting operation, an image-capturing operation, and an image data recording operation are performed according to instructions from the surveying system controller 33.

Further, measurement data obtained by the measurement module 24 is in turn transmitted to the surveying system controller 33 through the rotational electrical contact ring 23, and then recorded in a card-type recording medium attached to a recording medium I/O socket 34. Namely, the data is recorded via the I/O socket 34 connected to the surveying system controller 33. Further, an I/O connector 35 for connecting external devices is connected to the survey system controller 33 so that the measurement data can be transmitted to a data collector or a computer that is connected to the connector 35 via an interface cable.

Further, a switch group 36, which is provided on the operational panels 21A and 21B, is also connected to the surveying system controller 33. The surveying system controller 33 operates mode selection, surveying control, image capturing, data recording, data communication, and so on, in accordance with operations of the switch group 36. Moreover, information relating to the mode and/or the measurement data is indicated on the indicators 22A and 22B using characters and/or symbols.

Note that structures illustrated by broken lines may also be added to the system, such as the digital image signals from the digital signal processor 29 being converted to analog signals (e.g., a composite signal) at a D/A converter and transmitted to the surveying system controller 33 through the rotational electric contact ring 33.

An image that is obtained by the digital camera unit 14 is recorded into the recording medium attached to the I/O socket 19, as an image data file. Further, measurement data, which is transmitted in sequence from the measurement module 24 to the measurement system controller 33, is recorded into the recording medium attached to the socket 34 as a single measurement data file, which includes a series of measurement data for a plurality of measurement points that are measured in one continuous surveying. Preferably, the image data file and the measurement data file include relational information that enables either of the files to relate to the other.

This relational information may be given by adding file information for a conjugate file in the header area of one or both files. Further, the relational information can also be stored by an exclusive separate file used for recording the relationship between the image data files and the measurement data files.

In some cases, the image data (the image data file) may only correspond to a particular measurement point of the measurement data recorded in the measurement data file. Therefore, measurement data file information (e.g., a file name), and an index of measurement data of the measurement points that correspond to the image data file, may be recorded in the header area of the image data file. Further, the series of measurement data can be transmitted from the support block 12 to the digital camera unit 14 (to the telescope block 11) via the rotational electric contact ring 23 in order to record the series of measurement data into the recording medium, which is attached to the I/O socket 19, together with the corresponding image data file. Furthermore, the image data (i.e., the image data file) and the series of measurement data (i.e., the measurement data file) can be transmitted in a predetermined order to an external device through the external device I/O connector 20 or the wireless communication module 31.

As described above, according to the present embodiment, since the image-display device that is used to display a captured image is provided on the digital camera unit 14, which is integrated with the telescope block, the quality and the resolution of the displayed image do not deteriorate, unlike the case of transmitting the image data to the support block and displaying the image on an image-display device on the support block side. Further, the digital camera unit of the present embodiment includes an I/O socket for a recording medium, non-volatile memory, an I/O connector for connecting external devices, and a wireless communication module, thus the image data can be recorded or output without the quality and the resolution of the image deteriorating. Note that these effects can also be obtained by using one of the above components.

Further, in the present embodiment, the socket for attaching the recording medium and the connector for connecting the interface cable are arranged on the front side of the telescope block, therefore, they do not interfere with sighting operations, and this arrangement also has advantages in attaching and detaching the recording medium and the interface cable.

Although the embodiment of the present invention have been described herein with reference to the accompanying drawings, obviously many modifications and changes may be made by those skilled in this art without departing from the scope of the invention.

The present disclosure relates to subject matter contained in Japanese Patent Application No. 2006-183410 (filed on Jul. 3, 2006) which is expressly incorporated herein, by reference, in its entirety.

The invention claimed is:

1. A surveying apparatus comprising:
   A telescope block that includes a sighting telescope and is rotatably supported for rotation about a first axis;
   a support block that rotatably supports said telescope block for rotation about the first axis; and
   an imaging unit that is provided inside said telescope block;
   wherein said imaging unit comprises an image-display device and at least one of an image data output device and an image data recording device; and
   wherein measurement data is transmitted from said support block to said telescope block.

2. The apparatus according to claim 1, wherein said image data recording device includes a recording medium that is detachable from said telescope block.

3. The apparatus according to claim 2, wherein a socket for attaching said recording medium is disposed on a same face of said telescope block as an objective lens is provided.

4. The apparatus according to claim 1, wherein said image data recording device includes a non-volatile memory installed inside said telescope block.

5. The apparatus according to claim 1, wherein said image data output device includes a wireless communication module that communicates with an external device.

6. The apparatus according to claim 1, wherein said image data output device includes a connector for connecting with an external device through a cable.

7. The apparatus according to claim 6, wherein said connector is provided on a same face of said telescope block as an objective lens is provided.

8. The apparatus according to claim 1, wherein the measurement data is output from the telescope block to one of an external device and a recording medium together with image data obtained by said imaging unit via one of said image data output device and said image data recording device.

9. The apparatus according to claim 1, the telescope block and the support block being electrically connected to each other to transmit the measurement data between the support block and the telescope block.

10. The apparatus according to claim 9, an electrical contact ring being positioned intermediate the telescope block and the support block and configured to provide the electrical connection between the support block and the telescope block.

11. The apparatus according to claim 1, the support block comprising a socket configured to receive a removable recording medium, a connector for enabling an external device to be connected to said surveying apparatus and an indicator.

12. The apparatus according to claim 1, the support block being configured to support the telescope block for rotation about a horizontal axis, the support block being mounted to a leveling board for rotation about a vertical axis.

13. The apparatus according to claim 1, the support block being configured to support the telescope block for rotation about a horizontal axis and to be electrically connected to the telescope block to transmit the measurement data between the support block and the telescope block.

14. The apparatus according to claim 1, the imaging unit comprising a digital camera, an ocular lens of the sighting telescope and the image display device of the digital camera being provided on a same face of the telescope block.

15. The apparatus according to claim 14, the ocular lens and the image display device being spaced vertically with respect to each other.

16. The apparatus according to claim 1, an objective lens of the sighting telescope, a socket that receives a removable recording medium and a connector that receives a cable for connecting the surveying apparatus with an external device are provided on a same face of the telescope block.

17. The apparatus according to claim 1, the support block comprising a shaft that supports said telescope block for rotation about a horizontal axis and a contact ring that electrically connects the support block with the telescope block, the measurement data being transmitted through the contact ring.

18. The apparatus according to claim 1, data of an image obtained by said imaging unit being stored in a recording medium attached to said telescope block, the measurement data being stored in a recording medium attached to said support block, the data of an image and the measurement data including information that relates the data of an image with the measurement data.

19. The apparatus according to claim 1, data of an image obtained by said imaging unit being stored in a recording medium attached to said telescope block and measurement data corresponding to the data of an image being transmitted from the support block to the telescope block being stored in the recording medium attached to said telescope block.

20. The apparatus according to claim 1, the telescope block comprising a socket configured to receive a recording medium, a non-volatile memory, a connector configured to connect an external device to the surveying apparatus and a wireless communication module.

* * * * *